(12) United States Patent
Waters

(10) Patent No.: US 10,618,145 B2
(45) Date of Patent: Apr. 14, 2020

(54) PRESSING DEVICE FOR CONNECTING A ROOF PANEL TO SIDE ELEMENTS OF VEHICLES

(71) Applicant: FORD-WERKE GmbH, Cologne (DE)

(72) Inventor: Michael Waters, Leverkusen NRW (DE)

(73) Assignee: FORD-WERKE GmbH, Cologne (DE)

(*) Notice: Subject to any disclaimer, the term of this patent is extended or adjusted under 35 U.S.C. 154(b) by 241 days.

(21) Appl. No.: 15/792,489

(22) Filed: Oct. 24, 2017

(65) Prior Publication Data
US 2018/0117739 A1 May 3, 2018

(30) Foreign Application Priority Data

Oct. 28, 2016 (DE) .................... 10 2016 221 331

(51) Int. Cl.
| | |
|---|---|
| *B25B 5/06* | (2006.01) |
| *B62D 65/02* | (2006.01) |
| *B62D 65/06* | (2006.01) |
| *B23K 3/08* | (2006.01) |
| *B23K 37/04* | (2006.01) |
| *B23K 101/00* | (2006.01) |

(52) U.S. Cl.
CPC .............. *B25B 5/061* (2013.01); *B23K 3/087* (2013.01); *B23K 37/0443* (2013.01); *B62D 65/026* (2013.01); *B62D 65/06* (2013.01); *B23K 2101/006* (2018.08)

(58) Field of Classification Search
CPC ...... B25B 5/065; B62D 25/06; B62D 25/024; B62D 25/026
See application file for complete search history.

(56) References Cited

U.S. PATENT DOCUMENTS

| | | | | |
|---|---|---|---|---|
| 4,813,657 A | * | 3/1989 | Todd ..................... | B25B 5/065 269/22 |
| 6,253,439 B1 | * | 7/2001 | Niehwohner ......... | B62D 65/06 29/243.5 |
| 7,044,706 B2 | * | 5/2006 | Jung .................... | B25J 15/0052 294/119.1 |

(Continued)

FOREIGN PATENT DOCUMENTS

| | | |
|---|---|---|
| DE | 7438202 | 4/1975 |
| DE | 10061309 | 6/2002 |

(Continued)

OTHER PUBLICATIONS

FR2535830—Machine Translation. InnovationQ. https://iq.ip.com (Year: 2019).*

*Primary Examiner* — Tyrone V Hall, Jr.
(74) *Attorney, Agent, or Firm* — David Coppiellie; Brooks Kushman P.C.

(57) ABSTRACT

A pressing device for pressing a first component, such as a roof panel, onto an additional component, such as one or more a vehicle side bodywork components or vehicle side bodywork supports. A hose is arranged in a housing and is filled with a fluid to selectively press the first component onto the additional component to facilitate a laser brazing operation by closing a gap between the first component and the additional component. A T-shaped pressure element is arranged in the housing and is moved relative to the housing by controlling the pressure of the fluid supplied to the hose.

16 Claims, 2 Drawing Sheets

(56) References Cited

U.S. PATENT DOCUMENTS

| 2006/0179628 | A1* | 8/2006 | Sturm | B23K 37/0443 29/33 P |
| 2007/0246876 | A1* | 10/2007 | Wood | B25B 5/003 269/22 |
| 2010/0096792 | A1* | 4/2010 | Demmeler | B25B 1/106 269/216 |

FOREIGN PATENT DOCUMENTS

| FR | 2535830 A1 * | 5/1984 | B23Q 3/082 |
| WO | 2006082349 | 8/2006 | |

\* cited by examiner ent, for example, a vehicle side component, with a
force applying element arranged in a housing that presses
the first component onto the additional component.

PRESSING DEVICE FOR CONNECTING A ROOF PANEL TO SIDE ELEMENTS OF VEHICLES

CROSS-REFERENCE TO RELATED APPLICATIONS

This application claims foreign priority benefits under 35 U.S.C. § 119(a)-(d) to DE Application 10 2016 221 331.8 filed Oct. 28, 2016, which is hereby incorporated by reference in its entirety.

TECHNICAL FIELD

This disclosure relates to an apparatus for pressing a first component, for example, a roof panel, onto an additional component, for example, a vehicle side component, with a force applying element arranged in a housing that presses the first component onto the additional component.

BACKGROUND

In the automotive industry, panels are connected to other components. For example, a roof panel is connected to vehicle side components by solder connections or weld connections. The roof panel may be formed by a steel sheet or a light metal sheet. The vehicle side bodywork components may also be produced from a steel or from a light metal. For example, with solder connections, a good fit of the elements which are intended to be connected to each other is required to be able to achieve the necessary solder quality or weld quality. The roof panel must be supported on supports relative to the side components with a maximum gap of 0.3 mm to be acceptable for producing a solder joint within required quality specifications.

The maximum possible gap dimension may not always be met and measures have been developed for achieving the maximum possible gap dimension. Deviations from the maximum gap specification may not always occur repeatedly at the same location, but may instead occur randomly at different locations. For example, if excessive pressure is applied to a roof panel to achieve an adequate solder connection, the roof panel may become deformed in an undulating manner. Roof panels that are heavily deformed may need to be scrapped.

One example of a pressing device is disclosed in DE 100 61 309 A1 that uses a gripper to join roof panels to side walls of vehicle body. The joining gripper comprises a robot-guided frame having a plurality of suction grippers. The pressing device is arranged on the periphery of the frame and acts on the joining component. The pressing device is a pressure hose which is arranged in a housing. Pressure hoses are arranged on both sides and extend along the connection seam. The longitudinal edges of the roof panel are pressed against the supports on the side walls to prevent deformation or damage to the roof panel. The pressure hose extends over the entire length of the roof to ensures consistent pressure everywhere to prevent deformation but does not ensure a reliable abutment of the roof panel on the side wall supports. After the roof panel is connected to the side walls by means of laser soldering, inadequate pressure results in gap formation problems if the side components of the bodywork have positional tolerances. In this instance, the solder connection may be inadequate.

EP 1 599 378 B1 relates to the joining of roof panels to vehicle side components. In this instance, in place of a pressure hose, a pressure bar is provided on a joining gripper. The pressure bar adapts to the joining contour. A reliable abutment with a precise gap is possible along the entire joining contour. The pressure bar is sub-divided into a plurality of bar segments having a specific configuration of each individual segment to enable a more precise shape adaptation to the joining contour. The bar segments are independently supported in a flexible manner.

WO2006/082349 A1 discloses a device for pressing a roof panel against vehicle side components. With this device, a large number of pressing devices are used to apply different pressures at different locations on the roof panel.

This disclosure is directed to solving the above problems and other problems as summarized below.

SUMMARY

One object is to provide an improved pressing device that achieves sufficient material engaging connection between both components that are to be connected. At the same time, permissible deformation or undulation of the roof panel may be obtained independently of production tolerances.

It should be noted that the features and measures which are set out individually in the following description can be combined with each other in any technically advantageous manner to provide other embodiments of the invention. The description additionally characterizes and specifies the disclosure in connection with the Figures.

According to one aspect of this disclosure, a pressing device is disclosed for pressing a first component can be pressed against another component. The first component may, for example, be a roof panel and the additional component may, for example, be a vehicle side component. The pressing device has a force applying element arranged in a housing. A pressure element may be moved relative to the housing and is arranged in the housing in addition to the force element.

The pressure element may be T-shaped with an upper web and a pressure web that extends perpendicularly to the upper web. The upper web may be wider than the pressure web so that the upper web has protruding support portions that protrude beyond the pressure web on both sides. The protruding support portions limit movement of the pressure element in cooperation with a correspondingly constructed counter-abutment of the housing.

The pressure element is received in the housing with the force element acting on the upper web of the pressure element. The pressure element extends along a connection line of the roof panel to the vehicle side component. The pressing device acts on each location of the connection line.

The pressure element is resiliently flexible to be bendable. The pressure element is acted upon by the force element to be adapted to the shape of the first component, e.g. the roof panel. In regions in which the roof panel is already sufficiently in abutment to be gap-free with a support of the side component, the roof panel is not pressed in the direction toward the vehicle side component. However, in regions in which a gap is present or where the maximum possible gap dimension of 0.3 mm is exceeded, the pressure element may be deformed and bend to press down the roof panel at least up to the maximum possible gap dimension in the direction toward the support of the vehicle side component. The gap is reduced, and preferably completely closed.

The pressure element is flexible and may be moved relative to the housing. Maximum movement of the pressure element is limited to reduce the gap or to completely close and to limit the maximum undulation depth of the roof panel. Different pressure elements may be received inside the housing with pressure webs of different vertical extents. The pressure web may, for example, be constructed with the protruding portions of the upper web having a range of movement limited to a magnitude of 0.5 mm or also 0.7 mm relative to the counter-abutment of the housing. The values mentioned are intended to be understood to be only exemplary and are not intended to be limiting. It is possible to close the gap, in most cases not completely, but instead to reduce it to the maximum possible gap width of 0.3 mm so that a solder or weld connection can be produced that complies with specified requirements, and at the same time prevent excessive formation of undulations of the roof panel.

The force element may be a pressure hose, eg. water hoses. The force element is arranged along the entire axial length between the upper web and the housing. The force element has a base extent when in a rest state and is not acted on with a force. The force element increases its effective force on the pressure element in a pressure state to press the pressure element out of the housing. For example, the pressure hose may be expanded by pumping water or air into the pressure hose. The pressure element is pressed out of the housing and moved relative to the abutment to cause the pressure web to act directly on the roof panel and close or at least reduce any gap that may be present. The force applied by the force element on the pressure element can be adjusted by providing more or less pressure with the force element so that only the necessary force also acts on the roof element to close the gap or reduce the gap to the maximum possible gap dimension. The force is adjusted by providing more or less fluid medium to the force element, or hose, to change the extent of the expansion of the force element, or hose.

In one embodiment, the connection region may be examined to determine the presence of a gap and the dimension of the gap. The gap may be visually checked or checked with cameras. The examination camera may be connected to a control unit that stores the actual data and a control signal may be generated to control the pressure provided by the force element. The examination can also be carried out visually and the force element pressure may be adjusted manually.

If the force element is a hose filled with water, the hose may also perform a cooling function. Other suitable cooling media can also be used for this purpose.

A gripper device having suction cups may be provided to grip the roof panel. The roof panel can be transported and placed on the supports of the side elements with the gripper device. The housing may be integral with the gripper device. The housing may be polygonal in cross-section, for example, in a quadrilateral shape with an opening on one side. The housing may have a receiving region that completely receives the force element and the upper web of the pressure element. The receiving region opens toward the lower side and is adapted to receive the upper web of the pressure element. The opening is adapted to receive the pressure web. The receiving region when viewed in cross-section is wider than the opening. A flange-like continuation or flange, is formed at both sides of the opening when viewed in cross-section which forms the counter-abutment for limiting the movement of the pressure element.

The invention provides a flexible system for pressing the roof panel onto the vehicle side component to reduce local gaps. The pressure element is flexibly constructed and can adapt to the locally different circumstances. The force element is placed under pressure, for example, by the pressure hose to apply a force to the pressure element and move the pressure web out of the housing. At locations where no gap is present, the roof panel is not pressed down. At locations where a gap is present, the pressure element may be flexibly deformed because of the action of the force element that bends as the pressure applicator is pressed out of the housing. The roof panel is pressed onto the vehicle side components and the local gap is closed or at least reduced. The height of the pressure web determines the maximum movement value to determine a compromise between the corrected gap dimension and a possible wave formation of the roof element.

The above aspects of this disclosure and other aspects will be described below with reference to the attached drawings.

DETAILED DESCRIPTION

Figure 1:
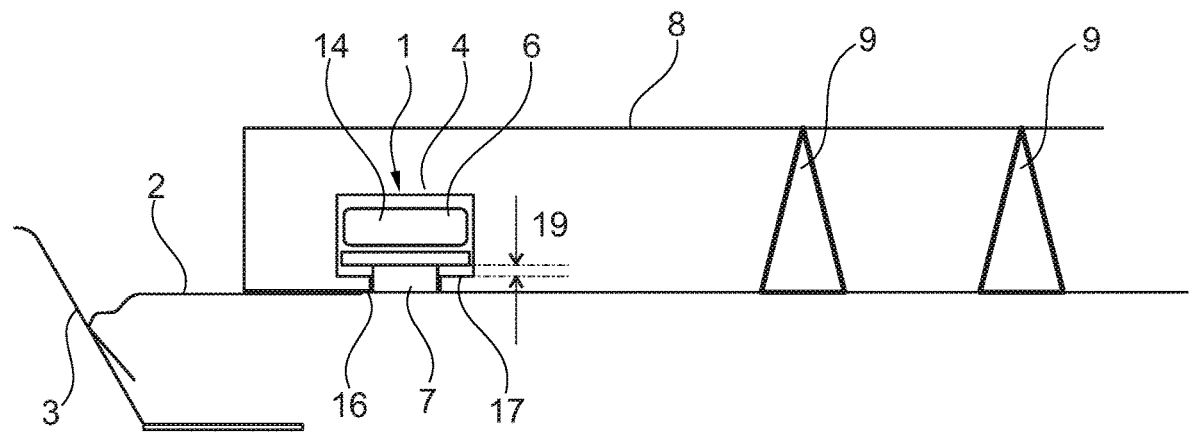
FIG. 1 is a schematic view of a roof element placed on a vehicle side component with the pressing device.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

In the different Figures, identical components are always given the same reference numerals, for which reason they are generally also described only once.

FIG. 1 shows a pressing device 1 for pressing a first component 2 onto an additional component 3. The first component 2 is, for example, a roof panel 2 of a motor vehicle. The additional component 3 is, for example, a vehicle side bodywork component 3. The pressing device 1 has a force element 6 received in a housing 4. In addition to the force element 6, a pressure element 7 is arranged in the housing 4 which can be moved relative to the housing 4.

The housing 4 is formed integrally with a gripper device 8. The gripper device 8 has suction elements 9 which draw in the roof panel 2 so that the roof panel 2 can be transported by means of the gripper device 8 and can be placed on the vehicle side component 3 or on the support thereof.

Figure 4:
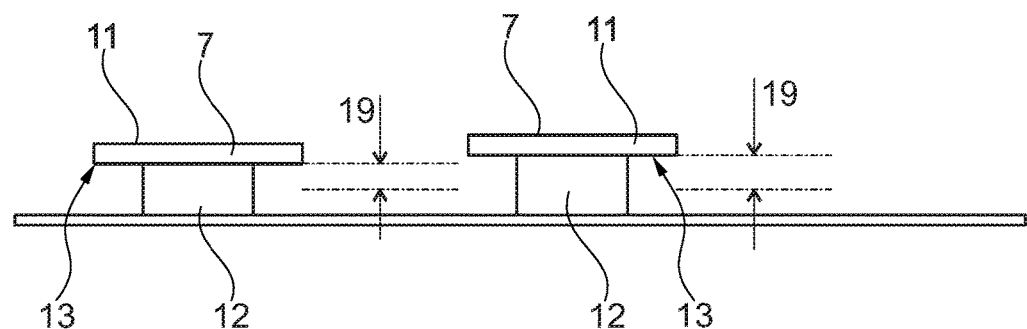
FIG. 4 is a schematic view of two different pressure elements having pressure webs of different heights.

Referring to FIG. 4, the pressure element 7 is constructed to be T-shaped with an upper web 11 orientated in a horizontal manner in the drawing plane and a pressure web 12 arranged perpendicularly thereto. The pressure web 12 is narrower than the upper web 11 so that the upper web 11 protrudes beyond the pressure web 12 when viewed in cross-section at both sides of the pressure web 12 with abutment portions 13. The pressure element 7 is flexibly resilient and can be longitudinally bent.

The housing 4 has a receiving region 14 and an opening 16. The receiving region 14 is adapted to receive the upper web 11 and the opening 16 is adapted to receive the pressure web 12. Flanges 17 are provided in the region of the opening 16 which form a counter-abutment for the abutment portions 13. The abutment portions 13 and the counter-abutment flanges 17 limit the movement of the pressure element 7.

The force element 6 is, for example, a pressure hose which is flexible can be expanded. The force element 6 is arranged in the housing 4 above the upper web 11 of the pressure element 7.

Figure 3:
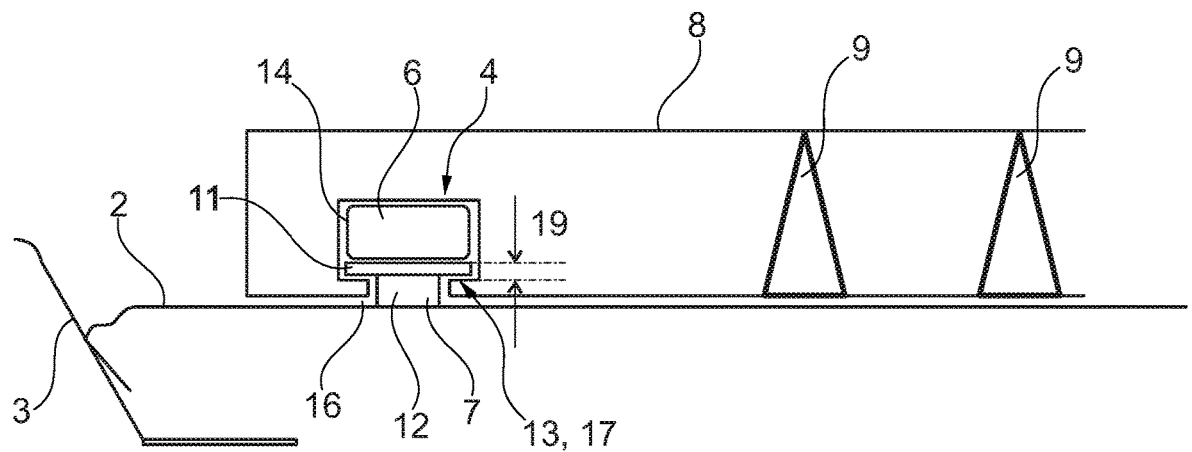
FIG. 3 is a schematic view similar to FIG. 2 with a gap shown in FIG. 2 between the roof element and the vehicle side component being closed.

As shown in FIG. 3, pressure is applied to the force element 6, for example, by being pumped up with water. The water expands the hose and presses the pressure web 12 of the pressure element 7 out of the housing 4.

The pressing device 1 closes local gaps 18 or at least reduces the gap dimension to a maximum possible gap dimension.

As shown in FIG. 1, the roof panel 2 is placed in abutment with the vehicle side component 3 in an almost gap-free manner.

Figure 2:
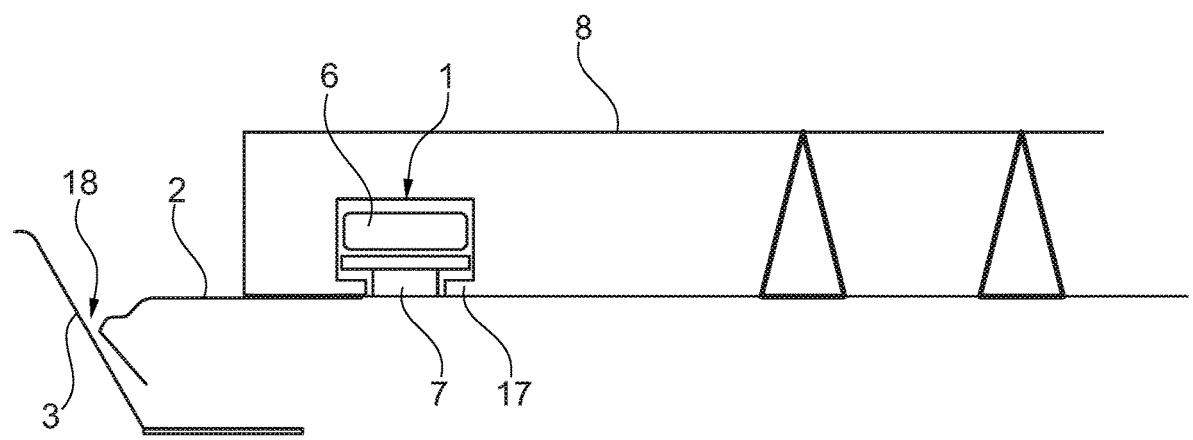
FIG. 2 is a schematic view similar to FIG. 1 with a gap illustrated between the roof element and vehicle side component.

Referring to FIG. 2, a gap 18 is present which has a value greater than the maximum possible gap dimension. The force element 6 is in the rest state and a abutment portions is arranged with the upper web 11 spaced apart from the flange-like 13 within the housing 4. The gripper device 8 is positioned on the roof panel 2.

To close or at least reduce the gap 18, the force element 6 is acted on with pressure to expand the hose cover. The force element 6 acts on the pressure element 7 with an individually adjustable force. In the embodiment including a pressure hose, an identical force acts along the force element 6. The resulting force may be able to be locally adjusted along the force element. For example, the force element 6 may have specific local regions that generate a specific required force. Such a force element could be a locally controllable actuator. The adjustable force may be provided, for example, based upon the gap dimension. The pressure element 7 is pressed out of the housing 4 and the roof panel 2 is pressed in the direction of the vehicle side component 3 to close the gap as shown in FIG. 3. The gripper device 8 is slightly lifted from the roof panel 2 in the region of the acting pressing device 1.

The pressing device 1 is arranged to extend along both sides of the planned connection of the roof panel 2 with respect to the vehicle side component 3. The pressure element 7 is resiliently flexible or bendable to contact the panel where localized gaps are provided. In the regions where there is no gap, as illustrated in FIG. 1, the roof element 2 is not pressed down, despite the force element 6 acting on the pressure element 7. In contrast, the pressure element 7 is deformed in the gap region and is bent and moved downwardly to press the roof panel 2 down.

The roof element 2 may be soldered or welded to the vehicle side component 3 when all the local gaps 18 are closed.

FIG. 4 illustrates two different pressure elements 7 that differ in the height of their pressure webs 12. A maximum movement value 19 with respect to the different pressure elements 7 is different. If the maximum movement value 19 is achieved, the upper web 11 is in abutment with the abutment portions 13 of the counter-abutment of the housing 4 against the flanges 17. Different pressure elements 7 can be readily replaced. To replace the pressure elements the upper piece 11 is introduced into the laterally open housing 4 and pulled into the housing 4 in abutment with the flange-like continuations 17. The continuations 17 may a dual function, on the one hand, the flanges 17 limit movement and, on the other hand, the flanges may function as an auxiliary draw-in member for the pressure element 7.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A pressing device for pressing a first component onto an additional component comprising:
   a housing;
   a gripper integrally provided in the housing;
   a force element disposed in the housing; and
   a pressure element partially disposed in the housing including a pressure web movable relative to the housing by the force element for pressing the first component onto the additional component.

2. The pressing device of claim 1, wherein the pressure element is T-shaped with an upper web arranged perpendicularly to the pressure web.

3. The pressing device of claim 2, wherein the upper web of the pressure element is wider than the pressure web and protrudes beyond the pressure web to form abutment portions that cooperate with a counter-abutment portions of the housing that limit movement of the pressure element.

4. The pressing device of claim 1, wherein the pressure element extends along a connection line of the first component to the additional component.

5. The pressing device of claim 1 wherein the pressure element is resiliently flexible to be bendable in a longitudinal direction.

6. The pressing device of claim 1 wherein a vertical extent of the pressure web can be provided in a range of vertical extents.

7. The pressing device of claim 1 wherein the force element is a pressure hose that can be filled with a liquid or gaseous medium.

8. The pressing device of claim 1 wherein the housing has a polygonal cross-section defining a receiving region and an opening, wherein the receiving region is wider than the opening.

9. The pressing device of claim 8 wherein the polygonal cross-section of the housing is quadrilateral in shape.

10. The pressing device of claim 8 wherein the opening is defined by flanges that limit movement of the pressure element.

11. A clamping apparatus for assembling a panel to side bodywork of a vehicle comprising:
    a housing;
    suction cups assembled to the housing for holding the panel while the panel is assembled to the side bodywork;
    a receiving region defined by the housing;
    a pressure applicator having an upper portion in the housing and an extendable portion extending through an opening defined by the housing; and
    a hose disposed in the housing that is filled with a fluid, wherein the hose presses the upper portion to extend the extendable portion from the opening.

12. The clamping apparatus of claim 11 wherein the receiving region includes a pair of flanges that extend toward each other to define the opening in the housing.

13. The clamping apparatus of claim 11 wherein the fluid is drawn from the hose to permit the extendable portion to withdraw into the opening.

14. A vehicle assembly apparatus comprising:

a support for a side bodywork component;

a clamp for pressing a roof on the side bodywork component;

suction cups assembled to the clamp for holding the roof while the roof is assembled to the side bodywork component;

a receiver defined by the clamp;

a pressure applicator having an upper portion in the receiver and an extendable portion extending through an opening defined by the receiver; and a hose filled with a fluid presses on the upper portion to extend the extendable portion from the opening.

15. The vehicle assembly apparatus of claim 14 wherein the receiver includes a pair of flanges that extend toward each other to define the opening in the clamp that limit the movement of the extendable portion of the pressure applicator.

16. The vehicle assembly apparatus of claim 14 wherein the fluid is drawn from the hose to permit the extendable portion to withdraw into the opening.

\* \* \* \* \*